United States Patent [19]
Yamada

[11] Patent Number: 5,694,200
[45] Date of Patent: Dec. 2, 1997

[54] PHOTOGRAPHIC PRINTING METHOD AND APPARATUS FOR AUTOMATICALLY DETERMINING WHETHER TO PRINT INDEX PICTURES

[75] Inventor: Junji Yamada, Wakayama, Japan

[73] Assignee: Noritsu Koki Co., Ltd., Wakayama, Japan

[21] Appl. No.: 593,711

[22] Filed: Jan. 29, 1996

[30] Foreign Application Priority Data

Jan. 30, 1995 [JP] Japan .................. 7-012650

[51] Int. Cl.⁶ .................. G03B 27/32; G03B 27/46
[52] U.S. Cl. .................. 355/40; 355/54; 396/207
[58] Field of Search .................. 355/54, 46, 40; 396/207, 210, 311

[56] References Cited

U.S. PATENT DOCUMENTS

| | | | |
|---|---|---|---|
| 4,417,811 | 11/1983 | Hamer | 355/40 |
| 4,805,039 | 2/1989 | Otake et al. | 358/335 |
| 5,031,773 | 7/1991 | Manico et al. | 355/54 |
| 5,109,241 | 4/1992 | Keeney | 354/21 |
| 5,184,227 | 2/1993 | Foley | 358/302 |
| 5,237,156 | 8/1993 | Konishi et al. | 355/40 |
| 5,447,827 | 9/1995 | Ishikawa et al. | 355/54 |
| 5,508,783 | 4/1996 | Iwagaki et al. | 355/40 |
| 5,530,517 | 6/1996 | Patton et al. | 355/40 |

FOREIGN PATENT DOCUMENTS 95104391  9/1993  Japan.

*Primary Examiner*—R. L. Moses
*Assistant Examiner*—Shival Virmani
*Attorney, Agent, or Firm*—Wenderoth, Lind & Ponack

[57] ABSTRACT

A photographic printing method and apparatus are characterized in that negative films are provided with marks which are indicative of whether the printing of index pictures is desired prior to the process of printing, and index pictures are systematically printed when it is determined that the printing of index pictures are desired through examination of the marks.

4 Claims, 2 Drawing Sheets

PHOTOGRAPHIC PRINTING METHOD AND APPARATUS FOR AUTOMATICALLY DETERMINING WHETHER TO PRINT INDEX PICTURES

BACKGROUND OF THE INVENTION

The present invention relates to a photographic printing method and apparatus for automatically determining whether the printing of index pictures from a developed negative film is required.

In general, index pictures are printed upon the request by a customer and are used for specifying frames of images on the negative film which will be subjected to additional copying. Such index pictures are provided in the form of a matrix of reduced size frames as is commonly printed on a commercial service print size. The index pictures are returned to the customer along with a set of normal size prints. When extra prints are desired, they are marked on the index picture and then the index picture is submitted to a commercial DPE shop. This allows desired frames to be printed without requiring the customer or printing operator to examine their locations on the negative film. Thus, a more efficient process for printing additional frames is achieved.

It is common in the prior art to classify a plurality of developed negative films into two types, films requiring index printing and films not requiring index printing. This classification is performed before the films are loaded into the photographic printing apparatus. The films requiring index printing are then subjected to both normal and index printing while the films not requiring index printing are exposed for producing normal prints only.

The disadvantage of the prior art is that the two types of negative films have to be separated from each other by manually determining whether each individual negative film requires index printing before being loaded into the photographic printing apparatus.

Although the photographic printing apparatus is equipped with an automatic negative film feeder, the negative films need to be examined for index printing and cannot be loaded automatically in sequence. Instead, each of the negative films is examined by an operator and if an index picture is required, a relevant command is entered into the photographic printing apparatus. This process introduces the possibility of operator error and is inefficient since each film must be inspected by the operator and a command must accordingly be entered for each film.

It is an object of the present invention, in view of the foregoing, to provide an improved photographic printing method and apparatus that is capable of automatically examining developed negative film to determine whether index printing is needed and, if so, correctly and readily producing index pictures as well as normal prints.

SUMMARY OF THE INVENTION

To achieve the foregoing object of the present invention, a photographic printing method and apparatus are characterized in that negative films are provided with marks which are indicative of whether the printing of index pictures is desired prior to the process of printing, and index pictures are systematically printed when it is determined that the printing of index pictures are desired through examination of the marks.

In action, a notch or punch hole is provided at a given location of each negative film prior to the process of printing. The negative film with the marks is then loaded into the photographic printing apparatus. As the negative film is systematically conveyed, its marks are examined with a detecting means such as a bar-code sensor unit or an image sensor. For example, if the presence of notch marks is detected, it is determined that the printing of index pictures is not desired. When the absence of marks is detected, it is determined that the printing of the index picture is desired and, thus, a command for printing the index pictures is sent to a printer which, in turn, produces a print of the index pictures after a set of normal prints are printed.

DETAILED DESCRIPTION OF THE PREFERRED EMBODIMENTS

An embodiment of the present invention will be described referring to FIGS. 1 to 4.

Figure 1:
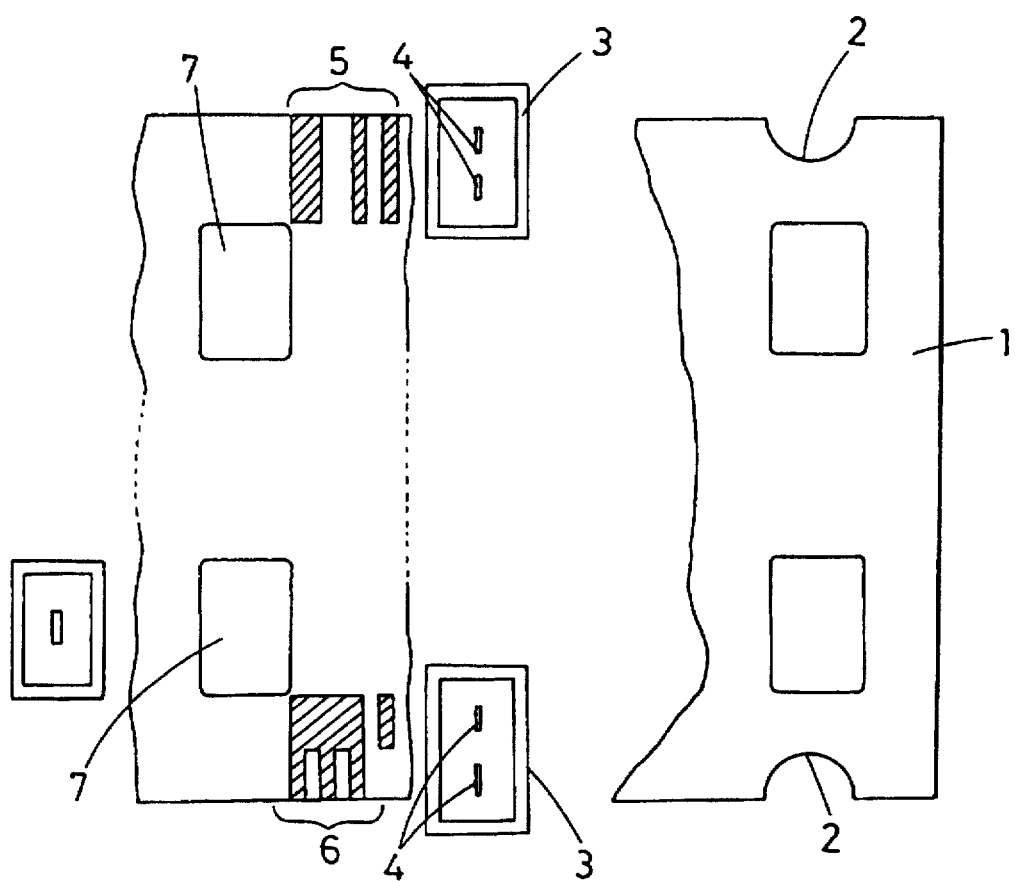
FIG. 1 is an explanatory view showing a primary part of one embodiment of the present invention.
Figure 2:
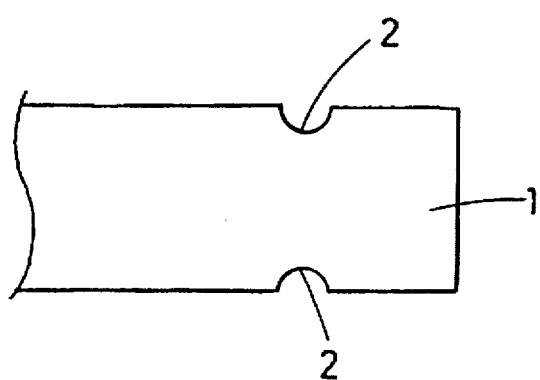
FIG. 2 is a plan view showing a part of a developed negative film provided with marks of one embodiment of the present invention.
Figure 3:
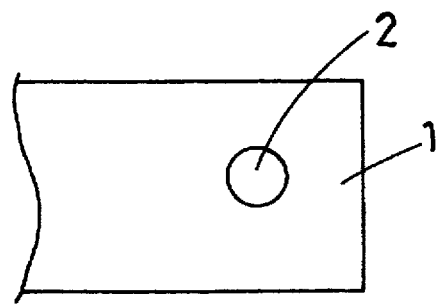
FIG. 3 is a plan view showing a part of a developed negative film provided with marks of another embodiment of the present invention.

FIG. 1 is an explanatory view showing a primary part of a photographic printing apparatus of one embodiment of the present invention in which developed negative film is examined to determine whether the printing of index pictures is desired. As best shown in FIGS. 2 and 3, a developed photographic negative film 1 (referred to as a negative hereinafter) carries one or more marks 2 for indexing which are detected by the photographic printing apparatus for determining whether the printing of index pictures is needed or not.

More specifically, FIG. 2 shows a pair of marks 2 provided in the form of two semicircular notches in the negative 1 and FIG. 3 shows a single mark 2 of a round punched hole provided in a center of the negative 1. In both embodiments, it is determined that the printing of index pictures is needed when the marks 2 are absent, and that the printing of index pictures are not needed when the marks 2 are present as detected by the photographic printing apparatus.

The marks 2 are formed in the negative 1, in which index pictures are not desired, before the action of printing a row of pictures (not shown) starts. During the printing process, a number of negatives 1 are loaded into the photographic printing apparatus by an operator and then they are automatically transferred to the exposure station where each frame of the negative is subjected to exposure processing. The frames on the negative 1 are then projected and printed on a printing paper when the time of exposure has elapsed as calculated by the photographic printing apparatus. At this time the presence of the marks 2 on the negative 1 is examined. If the marks 2 are detected, it is determined that the printing of index pictures is not desired. The printing of index pictures is implemented after a row of frames of the negative 1 are initially printed.

The presence of the marks 2 is examined by a detecting means or a bar-code sensor unit 3. As shown in FIG. 1, further provided is a sensor 4, a bar code 5 for frame numbers, a bar code 6 for index data, and rows of perforation 7.

Figure 4:
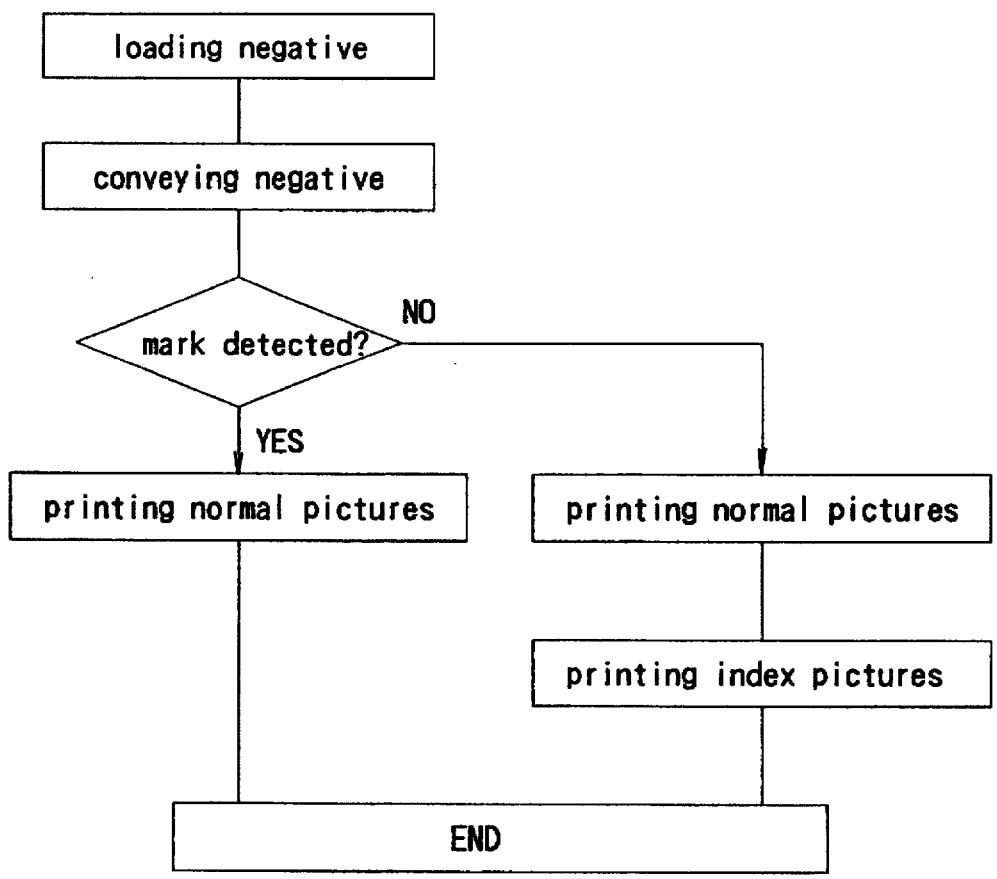
FIG. 4 is a flowchart showing steps of the printing process in a photographic printing apparatus according to the present invention.

The procedure of examining the presence of the marks 2 will be explained by referring to the flowchart of FIG. 4 in conjunction with the embodiment of FIG. 1. The procedure starts with step 1 for classifying a negative film 1, in which the marks 2 (of a notch or punch form) are provided when index pictures are not requested. Next, in step 2 the negative 1 is loaded into the photographic printing apparatus. Then, while the negative 1 is being conveyed, the notches or punch marks 2 are examined using the bar-code sensor unit 3 at step 3. This is followed by step 4 in which, upon detection of the marks 2, it is determined that index pictures are not needed. If a complete absence of the marks 2 is detected, it is then determined by the controller of the photographic printing apparatus that index pictures from the negative 1 are desired. The controller then directs the photographic printing apparatus to print the index pictures. Also, the means for detecting the marks may be any type of an image sensor which is installed in the photographic printing apparatus.

What is claimed is:

1. A photographic printing apparatus, comprising:

detection means for detecting a notch or a punched hole provided on a film, said notch or punched hole being provided prior to processing of the film, and said notch or punched hole being indicative as to whether printing of an index picture is desired; and determining means for determining whether printing of the index picture is desired in response to said detection means, wherein the index picture is printed when said determining means determines that the printing of the index picture is desired.

2. The photographic printing apparatus according to claim 1, wherein said determining means determines that the printing of the index picture for the film is desired when said detection means detects an absence of said notch or punched hole, and said determining means determines that the printing of the index picture for the film is not desired when said detection means detects the presence of said notch or punched hole.

3. A photographic printing method, comprising the steps of:

detecting a notch or a punched hole provided on a film, said notch or punched hole being provided prior to processing of the film, and said notch or punched hole being indicative as to whether printing of index picture is desired; and determining whether printing of the index picture is desired in response to said detecting step, wherein the index picture is printed when said determining means determines that the printing of the index picture is desired.

4. The photographic printing method according to claim 1, wherein said determining step determines that the printing of the index picture for the film is desired when said detection means detects an absence of said notch or punched hole, and said determining step determines that the printing of the index picture for the film is not desired when said detection means detects the presence of said notch or punched hole.

* * * * *